June 11, 1946.　　　E. A. NEHRING　　　2,402,071
COMBINED STACKER AND LOADER
Filed May 18, 1944　　　2 Sheets-Sheet 1
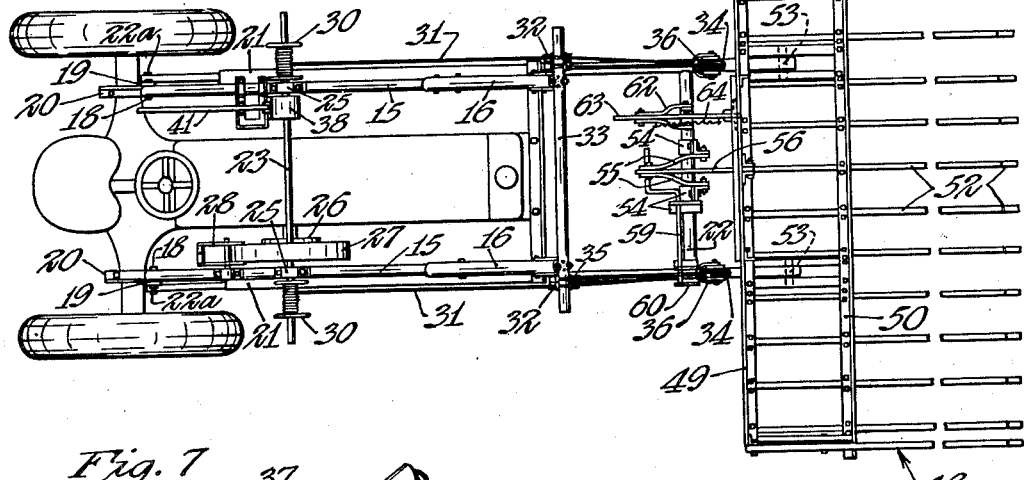
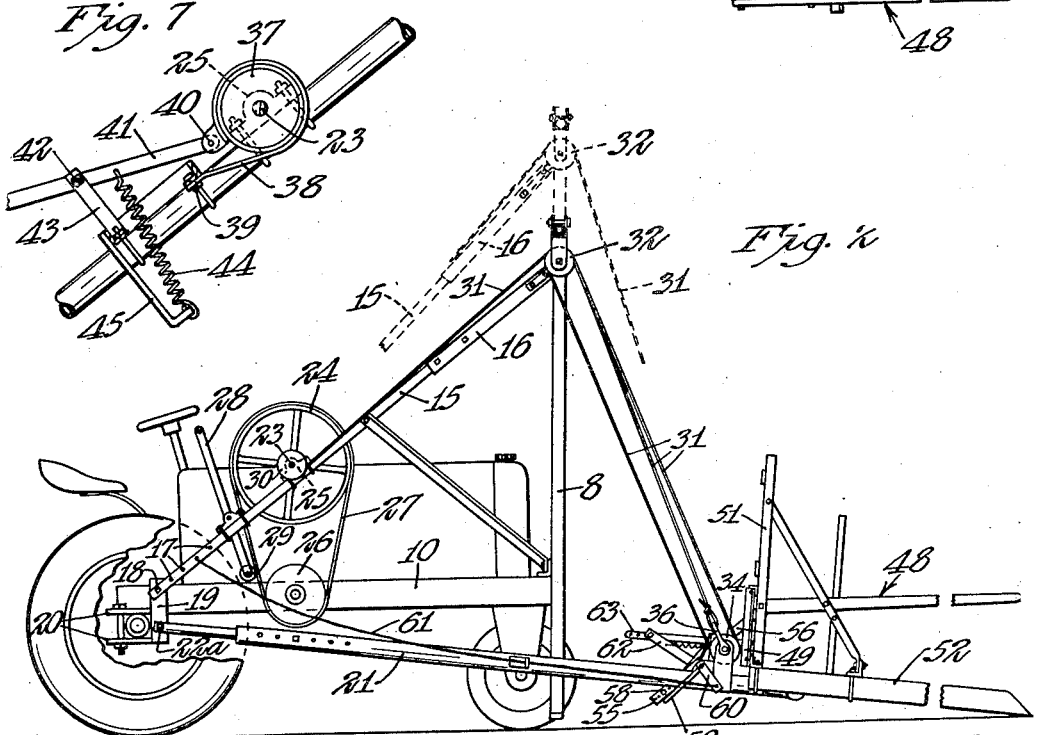
Inventor
Emil A. Nehring
By Williamson & Williamson
Attorneys June 11, 1946.  E. A. NEHRING  2,402,071
COMBINED STACKER AND LOADER
Filed May 18, 1944  2 Sheets-Sheet 2
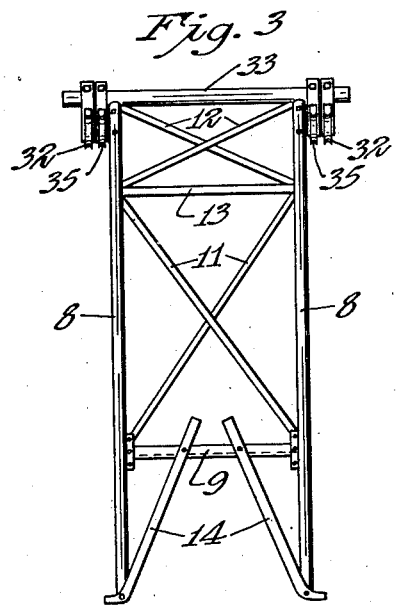
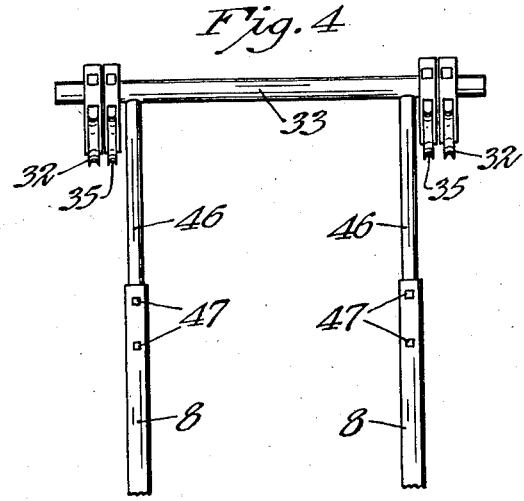
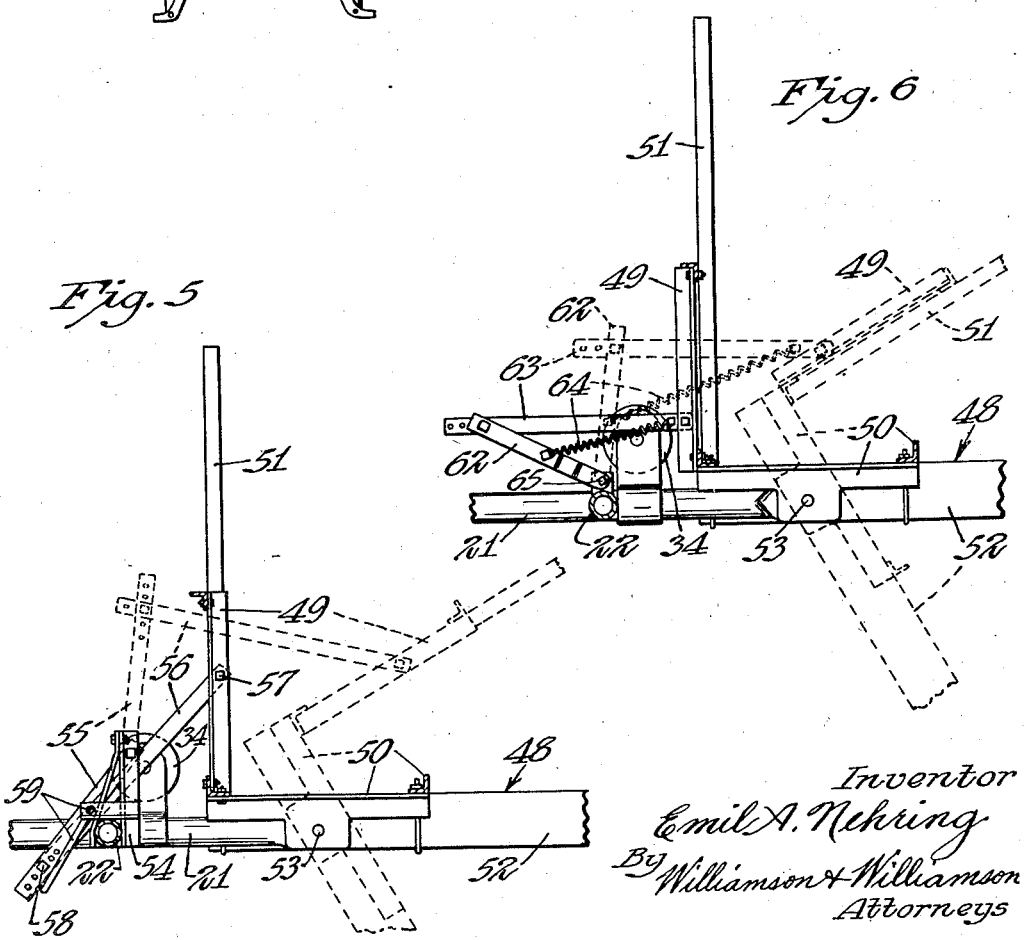
Inventor
Emil A. Nehring
By Williamson & Williamson
Attorneys Patented June 11, 1946

2,402,071

UNITED STATES PATENT OFFICE 2,402,071.

COMBINED STACKER AND LOADER

Emil A. Nehring, Elmore, Minn.

Application May 18, 1944, Serial No. 536,131

3 Claims. (Cl. 214—140)

This invention relates to material handling devices and more particularly to devices of that class known as hay stackers and manure loaders and the like.

One of the objects of the invention is to provide a hay stacker having a framework adapted to be mounted upon a tractor wherein the frame can be readily adjustable to suit different types of tractors and also wherein the frame can be extended vertically to adapt it for use either as a hay stacker or as a manure loader.

Another object of the invention is to provide simple yet effective means driven from the tractor engine for conveniently raising and lowering the rake proper.

Another object of the invention is to provide a stacker construction including a rake which is tiltable from a load supporting to a load dumping position wherein effective means is provided for releasably locking the rake in its load carrying position.

Still another object of the invention is to provide a hay rake and stacker including a tiltable rake member which includes means for counterbalancing the tilting action of the rake to reduce shock when the load is dumped and also to facilitate return of the rake to its load carrying position.

These and other objects and advantages of the invention will more fully appear from the following description made in connection with the accompanying drawings, wherein like reference characters refer to the same parts throughout the views, and, in which:

Figure 1 is a plan view of the device;

Figure 2 is a side view thereof with the upward extension shown in dotted lines;

Figure 3 is a front elevation of the forward frame upright;

Figure 4 is a front elevation of the vertical extension;

Figure 5 is an enlarged detail of the rake latching mechanism in alternate positions in full and dotted lines;

Figure 6 is a fragmentary detail of the rake cushioning and return mechanism in alternate positions in full and dotted lines; and Figure 7 is a detail of the brake control for lowering the rake and movable rake support.

The vertical upright frame member shown in Figure 3 includes a pair of main side members 8 and a lower cross member 9, the latter being adapted to rest upon and across the forward portion of the tractor frame 10. The upright frame members 8 are connected by suitable braces 11, 12 and 13 and a pair of lower braces 14 connect the lower ends of the frame uprights 8 with the lower frame cross member 9. A forwardly and upwardly slanting frame unit is made up of telescoping members 15 and 16 which are suitably arranged for longitudinal elongation.

The lower rear end of the slanting rear member 5 is provided with a pair of bolt receiving apertures 17 adapted to receive a tie bolt 18 which in turn is connected with a plate 19 secured to an axle clamp 20, the latter being adapted to be secured about the rear axle of the tractor.

A rake supporting and elevating member is shown made up of a pair of telescoping rods or pipes 21, the rear end of each of which is pivotally connected at 22a to the plate 19. The forward ends of the telescoping members 21 are connected by a cross member 22 which lies a short distance inwardly from the extreme ends of said members 21.

Extending between the slanting frame members 15 is a power shaft 23 which carries a large pulley 24. The shaft 23 is supported by bearings 25 which can be located at various positions along the slanting frame members 15. A pulley 26 is suitably supported by and adapted to be connected to the power plant of the tractor in a manner which is conventional and well known. Extending between the pulleys 24 and 26 is a drive belt 27 which is normally loose so that power will not be transmitted from the pulley 26 to the pulley 24.

Mounted on the slanting frame member 15 at the right hand side of the device is a pivoted hand lever 28 whose lower end is provided with a belt engaging roller 29. As viewed in Figure 2 when the lever 28 is actuated to swing its upper end rearwardly the roller 29 will engage the belt 27, placing it under tension so that power will be transmitted from the pulley 26 to the pulley 24.

On each end of the cross shaft 23 is a winding drum or reel 30 about which is wound a cable 31. Each cable 31 extends forwardly and upwardly over pulleys 32 which are carried by a cross member 33 extending between the upper ends of the vertical frame members 8. The cables 31 then extend downwardly and forwardly about pulleys 34 on the forward portions of the telescoping members 21. Cables 31 are then returned upwardly and around pulleys 35 and thence again downwardly and forwardly to be anchored to a U-shaped anchoring member 36. Rotation of the drums 30 causes the cables 31 to wind upon them and swing the telescoping rake carrying members 21 upwardly about their pivot 22a.

Mounted on the cross shaft 23 is a brake drum 37, the latter being fixed to the shaft 23 for rotation therewith. Extending about the drum 37 is a flexible brake band 38 one end of which is anchored to a bracket 39 and the other end of which is pivotally connected at 40 to a brake actuating lever 41. The lever 41 is pivotally connected at 42 to a bracket 43 mounted upon the left hand telescoping frame member 15. A tension spring 44 is connected between the brake lever 41 and a stationary bracket 45 to normally tighten the band 38 about the drum 37.

When the shaft 23 is rotated by its belt connection 27 to the power pulley 26 such rotation is in a clockwise direction. This is the direction of the shaft 23 when the cables 31 are being wound upon the drums 30 to raise the rake carrying members 21. When the power belt 27 is released to disconnect the pulleys 26 and 24 the weight of the brake carrying members 21 will tend to unwind the cables 31 and rotate the shaft 23 and brake drum 37 in a counterclockwise direction. Due to the action of the brake lever spring 44 and the arrangement of the brake band 38 said brake band will snub the rotation of the shaft 23 and prevent the rake carrying members 21 from falling. They can be locked by actuating the brake lever 41 to release the band 38 from the brake band 37 and rotation of the drum 37 and shaft 23 can be stopped at any intermediate point during the lowering operation.

As best shown, in Figure 4, the upper frame cross member 33 is provided with a pair of downwardly extending posts 46 which telescope into the frame uprights 8. The frame cross member 33 and its pulleys 32 and 35 can be raised relative to the frame uprights 8 to the position shown in Figure 4 and retained in such raised position by suitable bolts 47.

Referring to Figure 5, it will be seen that the rake proper indicated generally at 48 is provided with a rear upright frame portion 49 and a forwardly extending horizontal frame portion 50. Rake brake members 51 extend upwardly from the vertical rake frame portion 49 and rake tines 52 extend forwardly from the horizontal rake frame portion 50. The horizontal rake frame portion 50 is pivotally connected at 53 to the extreme forward ends of the rake carrying members 21 so that the rake unit 48 can be tilted from the full line loading position of Figure 5 to the dotted line load dumping position shown therein.

A pair of substantially stationary brackets 54 are clamped to the cross member 22 connecting the forward ends of the rake carrying members 21 and pivotally connected to the brackets 54 are the arms of a forked link 55. Pivotally connected to the rear or the left hand end of the forked link 55 is a link 56 which is also pivotally connected at 57 to a vertically intermediate portion of the vertical rake frame member 49. The links 55 and 56 provide means for releasably latching the rake in its full line load carrying position as indicated in Figure 5, and it will be seen that the links 55 and 56 can be swung rearwardly and downwardly as the rake is tilted from its dotted load dumping position until the pivot 58 connecting links 55 and 56 swings past a dead center position.

A crank-like lever 59 which is pivotally supported by the cross member 22 extends inwardly from the right hand rake carrying member 21 and has a crank portion lying beneath the pivotally connected ends of the links 55 and 56 so that the links can be returned to a position ahead of dead center to permit the rake 48 to tilt forwardly. The crank 59 has an actuating lever 60 mounted on its outer end and this lever is connected by a rope or lever 61 leading rearwardly to a point adjacent the tractor operator's seat.

In Figure 6 there is shown means for cushioning the dumping action of the rake 48 and also for returning the rake to its load carrying position after the load has been dumped. This mechanism includes a forked arm 62 pivotally connected at 63 to the cross member 22 connecting the rake carrying members 21. A second arm 63 is pivotally connected to the arms 62 and also to the vertical rake frame portion 49. A tension spring 64 is connected between the outer ends of the pivotally connected arms 62 and 63 and normally tends to fold said arms toward each other as clearly illustrated in Figure 6. When the rake 48 tilts forwardly to a dumping position the arms 62 and 63 will move from the full line position of Figure 2 to the dotted line position thereof and as soon as the outer ends of said arms swing away from each other the tension spring 64 will be placed under greater tension and permit the rake to dump with an easy tilting movement. As soon as the load is dumped from the rake the tension spring 64 will exert sufficient force to swing the rake back to its normal load carrying position as shown in full lines in Figure 6 and, of course, at the same time the latching links 55 and 56 will return to their rake securing position.

From the foregoing description it will be seen that I have provided a device which can be used as a hay rake or stacker or with a slightly different rake unit, as a manure loader, and the device is one which is relatively simple in structure and operation but at the same time highly efficient. The rake and its carrying members 21 are elevated by manipulation of the belt tightening lever 28 and when the rake has been raised to the desired height the belt tightening lever is released to disconnect the power whereupon the snubbing action of the brake band 38 will hold the rake in its elevated position. It can be lowered gradually by exerting a relatively slight pressure on the brake lever 41 or it can be dropped relatively rapidly until the rake reaches the ground whereupon the brake lever 41 can be released to halt further forward movement of the rake.

I provide means for extending the vertical frame from the full line to the dotted line position shown in Figure 2. In the upwardly extended position it is adapted purely for use as a hay stacker, the upward extension providing a greater upward swinging movement of the rake and its carrying members 21. However, when used as a manure loader I prefer to lower the vertical frame member to the position of Figure 2 since it provides a more compact and sturdy frame mechanism for withstanding the force necessary to run the rake into a relatively dense pile of manure or the like.

I have also provided effective latching means for the rake which will positively hold it in a load carrying position but which can be readily released to dump the rake with its load. Means is also provided for cushioning the dumping action and for returning the rake from its dumping to its load carrying position while at the same time causing the latch mechanism to assume a locked position.

It will, of course, be understood that various changes may be made in the form, details, arrangement and proportions of the various parts without departing from the scope of my invention.

What I claim is:

1. A material handling device comprising, a frame, a member connected to said frame for generally vertical movement relative thereto, a load carrier connected to said vertically movable member, said load carrier being tiltable from a load supporting to a load dumping position, latching means for said load carrier comprising, a pair of pivotally connected links having their opposite ends pivotally connected to said load carrier and to said vertically movable member respectively, said links being swingable to an over-dead center position when said load carrier is in load supporting position, and means for returning said links to a position ahead of dead center to permit said load carrier to swing to its dumping position.

2. A material handling device for tractors comprising, a boom having a pivotal tractor connection at one end thereof and means for supporting an implement at the other end thereof, a vertical frame member adapted to be mounted on a tractor and extending upwardly a considerable distance above said boom when the latter is in a generally horizontal position, an auxiliary vertical frame member supported by said first mentioned vertical frame member and vertically adjustable relative thereto, a brace extending downwardly and rearwardly from said auxiliary vertical frame member and having its lower rear end arranged for connection with the tractor, and a boom elevating cable extending from a point rearwardly of said vertical frame member to said auxiliary vertical frame member and thence downwardly to said boom.

3. A material handling device comprising, a frame, a member connected to said frame for generally vertical movement relative thereto, a load carrier connected to said vertically movable member and swingable relative thereto from a load supporting to a load dumping position, a spring device connected between said vertically movable member and said load carrier to counterbalance and cushion the swinging movement of said carrier relative to said vertically movable member, said spring device including a pair of pivotally interconnected arms having their outer ends connected to said vertically movable member and said load carrier respectively, and spring means connected between and yieldably urging said outer ends of said arms toward each other.

EMIL A. NEHRING.